United States Patent [19]
Wagner et al.

[11] Patent Number: 4,558,891
[45] Date of Patent: Dec. 17, 1985

[54] CLAMP FOR EXHAUST SYSTEM

[75] Inventors: Wayne M. Wagner, Apple Valley; Steven D. Schmeichel, Inver Grove Heights; Timothy A. Bethke, Apple Valley, all of Minn.

[73] Assignee: Donaldson Company, Inc., Minneapolis, Minn.

[21] Appl. No.: 513,920

[22] Filed: Jul. 14, 1983

[51] Int. Cl.[4] .............................................. F16B 2/08
[52] U.S. Cl. ..................................... 285/322; 24/276; 24/279; 285/420
[58] Field of Search .................. 24/276, 279, 19, 275, 24/280, 284, 285; 285/253, 373, 419, 420, 424, 322

[56] References Cited

U.S. PATENT DOCUMENTS

| | | |
|---|---|---|
| Re. 30,042 | 7/1979 | Hiemstra et al. |
| 1,221,425 | 4/1917 | Drennel ................ 24/279 |
| 1,252,637 | 1/1918 | Westcott ............... 24/276 |
| 1,473,715 | 11/1923 | Wessel ................. 24/279 |
| 1,806,867 | 5/1931 | Welsh .................. 24/279 |
| 1,827,195 | 10/1931 | Hansen ................. 24/279 |
| 1,978,195 | 10/1934 | Haas . |
| 2,330,898 | 10/1943 | King ................... 24/279 |
| 2,409,576 | 10/1946 | Markey . |
| 2,570,985 | 10/1951 | Riemenscheider et al. .... 24/279 X |
| 2,719,345 | 10/1955 | Riker . |
| 3,022,561 | 2/1962 | Jagiel ................. 24/284 |
| 3,905,623 | 9/1975 | Cassel . |
| 4,113,289 | 9/1978 | Wagner et al. . |
| 4,141,577 | 2/1979 | Beebe . |
| 4,365,392 | 12/1982 | Heckethorn ............. 24/276 X |

FOREIGN PATENT DOCUMENTS 2055416 3/1981 United Kingdom ................ 24/279

OTHER PUBLICATIONS

Heckethorn Manufacturing Co., Brochure #24400; undated.
Sure Grip Brochure; undated.
Aeroquip Bulletin 8133B; 1980.

*Primary Examiner*—William E. Lyddane
*Assistant Examiner*—James R. Brittain
*Attorney, Agent, or Firm*—Merchant, Gould, Smith, Edell, Welter & Schmidt

[57] ABSTRACT

The specification discloses an improved clamp (20) for securing overlapping telescoped ends of adjacent tubes in an exhaust system, or the like, to form a substantially leakproof joint. The clamp (20) includes a circular band (26) and a bolt (32) having a curved end (34) secured thereto over a predetermined circumferential distance adjacent one end of the band, and a straight threaded end extending through an extension (40) secured adjacent to the opposite end of the band. A nut (44) is provided on the straight bolt end (38) for tightening against the extension (40) to draw the ends (28 and 30) of the band (26) together in near abutting relationship to engage the lap joint over a substantially continuous circumferential area in a second embodiment (60). The extension (62) can bridge the gap to serve as a guide for the other end of the band, or it can be an integral portion (72 and 74) of the band in a third embodiment (70).

12 Claims, 11 Drawing Figures

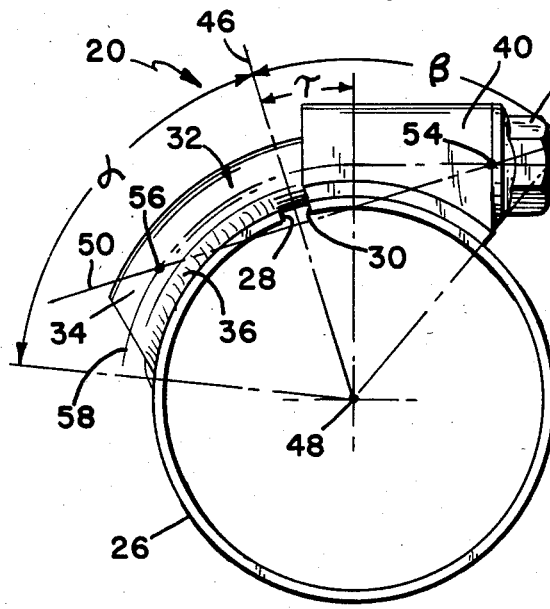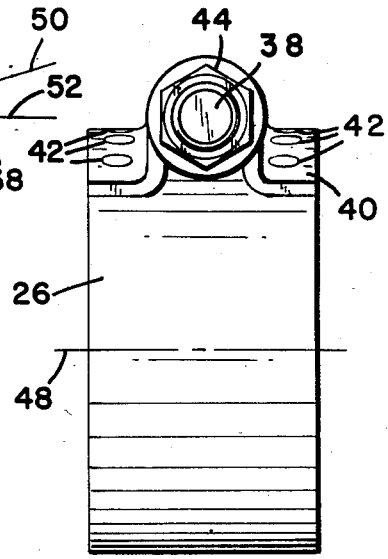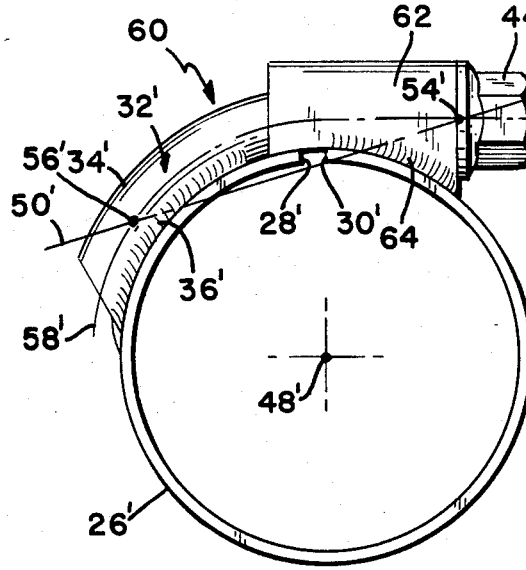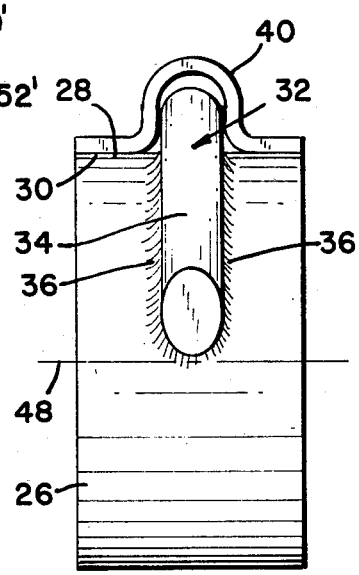

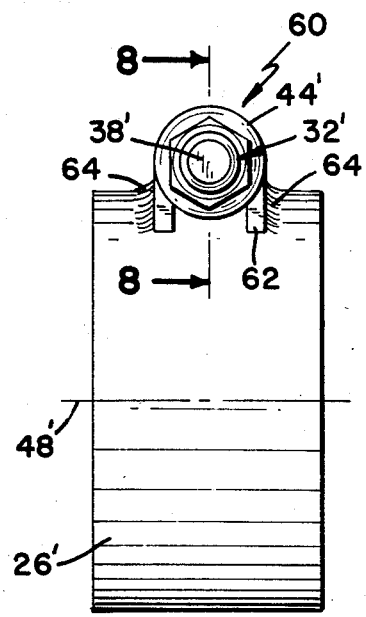
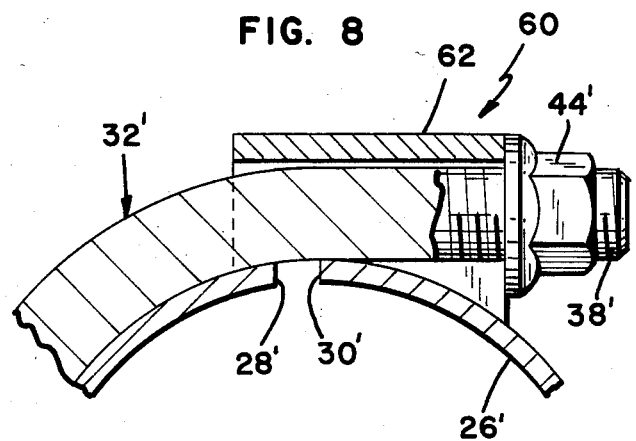
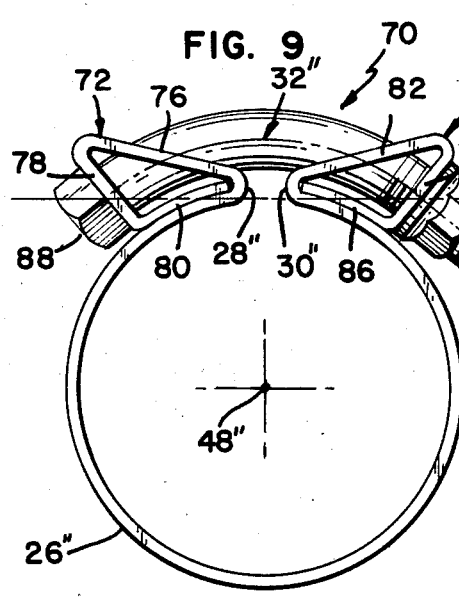
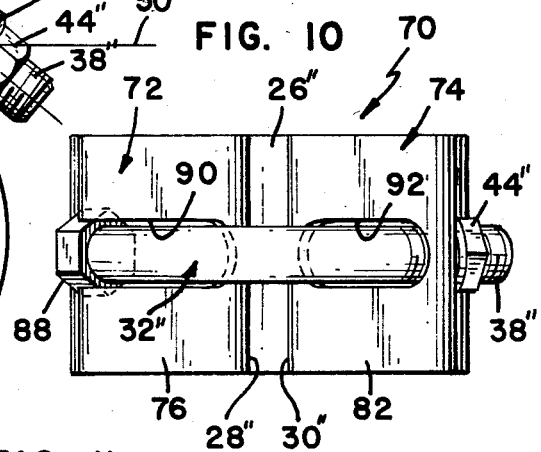
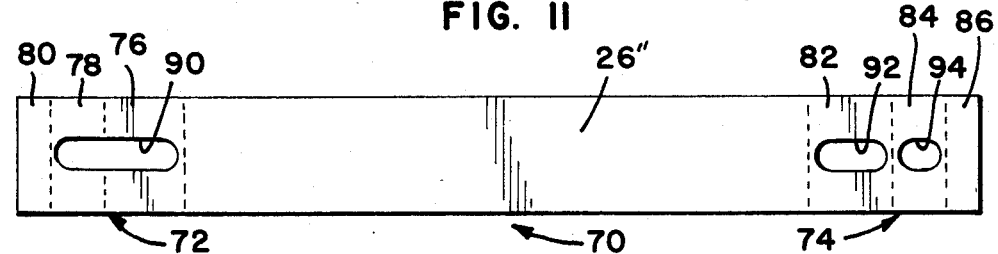

CLAMP FOR EXHAUST SYSTEM

TECHNICAL FIELD

The present invention relates generally to circumferential connectors, and more particularly to an improved clamp for securing lap joints formed at the telescoping ends adjacent lengths of tubing like that utilized in exhaust systems.

BACKGROUND ART

Automotive and truck exhaust systems comprise a conduit for directing exhaust gas from the engine to a remote location. Such exhaust systems typically include a muffler, catalytic converter, resonator, or combination thereof for treating the exhaust gas before discharge to the atmosphere. Such exhaust systems must also be designed to fit around and otherwise be compatible with various drive trains, chassis sizes, body styles and the like. The exhaust gas conduit is therefore usually comprised of several exhaust tubes or pipes of various shapes and lengths which are connected together to form a path for the exhaust gas. The exhaust gas conduits in tractors and construction vehicles are typically shorter in length with the muffler often being secured directly to the exhaust manifold.

The most common way of joining pipes to construct an exhaust conduit is to utilize lap joints wherein tubes of a given end diameter are inserted into adjacent tubes of different end diameter, and then clamped in the region where the pipes overlap. Clamping means which encircle the outer tube are tightened down so as to clamp the outer tube onto the inner tube in the overlapping region of the tube ends. The ends of the outer tubes typically include a number of longitudinal slots spaced about its circumference in order to facilitate deformation and inward crimping onto the end of the inner tube telescoped therein by action of the clamp.

Such clamps, of course, must provide a substantially leakproof as well as mechanically secure joint. Any leakage of exhaust gas at the joints presents a safety hazard because of escaping noxious fumes, and a noise problem because of the pulsating nature of the flow through the conduit. Since a number of such joints occur in most exhaust systems, it is also desirable that such clamps be inexpensive and easy to install, and if possible also easy to disconnect and reinstall if and when it later becomes necessary to replace a portion of the associated exhaust conduit. Such clamps are therefore very important components in exhaust systems.

A variety of clamps have been developed heretofore for use with lap joints, particularly those in exhaust systems. The most common clamping means is the so-called guillotine or saddle type clamp. This clamp comprises a U-bolt having a radius of curvature substantially equal to the outside radius of the outer tube, and a saddle with a similar radius which slides onto the legs of the U-bolt. The saddle and U-bolt are forced towards each other by means of a pair of nuts threaded onto the ends of the U-bolt legs to squeeze the overlapping ends of the tubes therein. The nuts must be tightened evenly to avoid distorting the joint, and this requires additional time and attention during assembly. U.S. Pat. No. 2,719,345 is illustrative of the prior art in this regard. Since some type of slots in the outer tube are usually necessary to provide for deformability, it can sometimes be difficult to achieve uniformly good leakproof joints with such clamps. The slots can be eliminated with very heavy duty clamps which are capable of deforming a bead through the outer tube into the inner tube, such as that shown in U.S. Pat. No. 4,183,122; however, higher installation torques are required and permanent tube deformation leads to difficulties later on because the joint cannot be readily taken apart for service and maintenance, such as for replacing a muffler.

More recently, improved leakproof clamps have been developed which surround the lap joint and extend past and around the end of the outer tube onto the inner tube. U.S. Pat. Nos. 3,944,265 and Re. 30,042 disclose a clamp having a band of ductile metal which, when stressed beyond its elastic limit, conforms intimately with the tubes about their entire circumferences. This clamp, however, requires special materials or an additional gasket seal and tends to be more expensive, and is thus not completely satisfactory in all cases.

There is thus still a need for an improved clamp which provides better production and installation efficiencies and which facilitates construction of secure, substantially leakproof lap joints in exhaust systems.

SUMMARY OF INVENTION

The present invention comprises a clamp which overcomes the foregoing and other difficulties associated with the prior art. In accordance with the invention, there is provided a clamp comprised of a cylindrical band having opposite ends located in spaced apart or near abutting relationship. A curved bolt is secured to the band over the gap between the ends. One end of the bolt is curved and can be secured to a portion of the band extending circumferentially away from one end thereof. The other end of the bolt is straight and slideably extends through an adapter or extension secured adjacent to the other end of the band. The straight end of the bolt is threaded and protrudes through the extension, and a nut is provided thereon for tightening against the extension to draw the ends of the band together in near abutting relationship. The bolt and extension are oriented such that the effective closing force exerted upon tightening the nut passes through or below the band gap so that substantially all of the torque applied by the fastener is transmitted to clamping to generate high gripping forces for a substantially leakproof connection with little or no pipe deformation. The extension can comprise a piece of generally U-shaped cross section which, if desired, can extend over the gap to serve as a guide for the other end of the band. The extension can be a separate piece welded adjacent to one end of the band, or one or both ends of the band can be formed into an integral extension.

BRIEF DESCRIPTION OF THE DRAWINGS

A better understanding of the invention can be had by reference to the following Detailed Description, in conjunction with the accompanying Drawings, wherein:

FIG. 3 is an end view of the clamp of the first embodiment, shown in the open position;

FIGS. 4 and 5 are opposite end views of the clamp shown in FIG. 3;

FIG. 6 is an end view of a clamp incorporating a second embodiment of the invention, shown in the open position;

FIG. 7 is an end view of the modified clamp shown in FIG. 6;

FIG. 8 is an enlarged partial cross sectional view taken along lines 8—8 of FIG. 7;

FIG. 9 is an end view of a clamp incorporating a third embodiment of the invention, shown in the open position; and FIG. 10 is a top view of the clamp of the third embodiment; and FIG. 11 is a flat layout of the band of the third embodiment.

DETAILED DESCRIPTION

Figure 1:
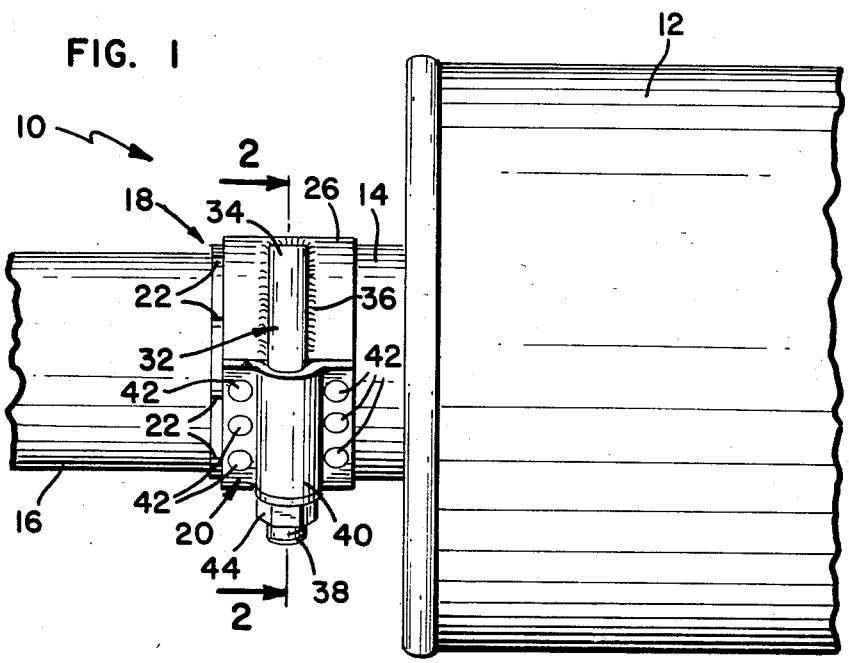
FIG. 1 is an illustration of a portion of an exhaust system incorporating a first embodiment of the improved clamp of the invention.

Referring now to the Drawings, wherein like reference numerals designate like or corresponding elements throughout the views, and particularly referring to FIG. 1, there is shown a portion of an exhaust system 10. Exhaust system 10 includes a conventional muffler 12, or other exhaust gas treatment device, having a collar or outer tube 14 which extends over the end of an inner tube 16 in telescoping fashion to form a lap joint 18 which is secured by a clamp 20 incorporating a first embodiment of the invention. The outside diameter of the end of the inner tube 16 is close to the inside diameter of the end of the outer tube 14 so that the tubes can be readily telescoped together with their ends overlapping before the clamp 20 is tightened to secure the lap joint 18. It is contemplated that the clamp 20 could be preassembled on the outer tube 14 of muffler 12 before insertion of the inner tube 16 to facilitate assembly of the exhaust system 10; however, the clamp could also be slid down the inner tube after insertion into position on the outer tube, if desired. As will be explained more fully hereinafter, the clamp 20 utilizes fewer parts arranged to provide a more rigid construction which is adapted to provide a substantially leakproof seal of better structural integrity with certain manufacturing and assembly advantages in completing the lap joint 18.

Figure 2:
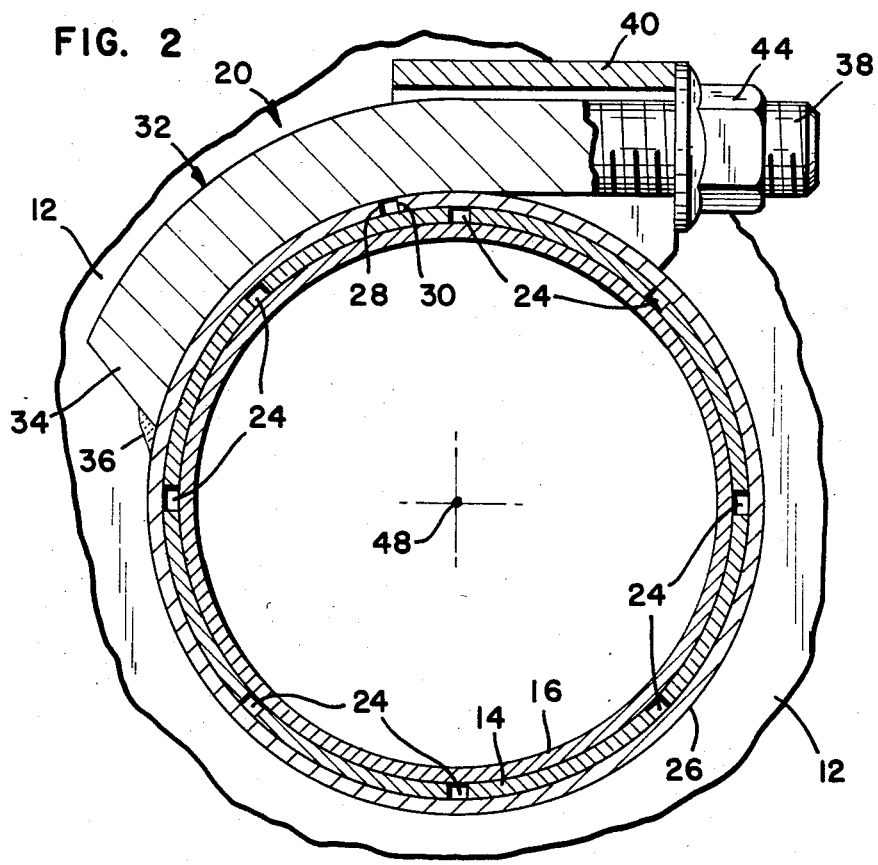
FIG. 2 is an enlarged cross sectional view taken along lines 2—2 of FIG. 1 in the direction of the arrows showing the change in closed position.

Although the clamp 20 is illustrated and described herein as being particularly suited for use in conjunction with lap joints in automotive, truck, industrial and agricultural exhaust systems, it will be understood that the clamp herein can also be utilized in other applications for releasably connecting lap joints within a fluid conduit. Similarly, although the clamp 20 is shown as being used in conjunction with a longitudinal slotted outer tube 14, it will be understood that the use of such slots in conjunction with the clamp is optional. Open end slots 22, as are best seen in FIG. 1, and closed captured slots 24, as are best seen in FIG. 2, in the outer tube 14 can be utilized if desired, and may be preferable in some applications, but are not considered critical to practice of the invention herein. The slots 22 and 24 can be constructed similarly to those shown in U.S. Pat. No. 4,113,289, the disclosure of which is hereby incorporated herein by reference. If desired, perforations can be substituted for the closed longitudinal captured slots 24.

The constructional details of the clamp 20 are shown in FIGS. 2-5. Clamp 20 comprises a cylindrical strap or band having opposite longitudinal ends 28 and 30 arranged in spaced apart, near abutting relationship. FIG. 2 shows the band in closed position with ends 28 and 30 in near abutting relationship, while FIG. 3 shows the band in open relaxed position with the ends more spaced apart. The ends 28 and 30 of band 26 are not overlapped. The band 26 can be formed of any suitable rigid material, such as 12 or 14 gauge aluminized steel of about 1.5 inches width and about 2.0–5.0 inches diameter, or otherwise sufficient to longitudinally and circumferentially surround the lap joint 18. The circumferential gap between ends 28 and 30 of band 26 in the open position can be about 0.25 inches.

A curved bolt 32 is positioned on the outside of band 26 midway between opposite edges thereof over the gap defined by the ends 28 and 30. Bolt 32 includes a curved end 34 which is preferably secured by welds 36 as shown to the band 26 extending away from end 28. The other end 38 of bolt 32 is substantially straight and threaded, and slidably extends through a clip or extension 40 secured to a portion of band 26 extending away from the opposite end 30. The adapter or extension 40 is of generally inverted U-shaped cross section, and can be constructed from suitable rigid material, such as 12 gauge aluminized steel secured to the band 26 by spot welds 42 along its flanges as shown. A flange nut 44 is provided on the threaded end 38 of bolt 32 for engagement with extension 40 to draw the bolt therein to tighten clamp 20.

The orientation and attachment of bolt 32 and extension 40 relative to the gap in band 26 comprise significant features of the present invention. Referring now particularly to FIG. 3, it will be seen that the radial line 46 extends from point 48, which is the axial center of band 26, outwardly through the center of the gap between ends 28 and 30. The arc angle alpha ($\alpha$) represents the approximate arc over which the curved end 34 of bolt 32 is secured to the portion of band 26 adjacent to end 28. The arc angle beta ($\beta$) is the approximate arc over which the extension 40 is secured to the portion of band 26 adjacent to end 30. The angle tau ($\tau$) represents the approximate arc angle between the center line of the gap between band ends 28 and 30, and the junction between the curved and straight portions of bolt 32. The components of clamp 20 and the angles alpha, beta and tau are dimensioned and selected so as to define an effective force line 50 which extends across band 26 between point 48 and ends 28 and 30, substantially tangential or nearly tangential to the longitudinal gap in band 26. In some cases, the effective force line 50 can extend chordwise inside the longitudinal gap in band 26, however, it should not extend outside it. It will be noted that the effective force line 50 intersects the center line 52 of the straight end 38 of bolt 32 substantially at the point 54 where the flange nut 44 engages the end of extension 40. It will also be noted that the curved bolt end 34 extends somewhat beyond the point 56 where line 50 intersects its center line 58, but less than one quadrant of the band 26. For example, the angle alpha can be about 30–90 degrees, beta can be about 30–60 degrees decreasing with increasing clamp diameter, and tau can be about 10–20 degrees.

The use of a curved bolt 32 secured across the longitudinal gap of a band 26 in such a way that the effective force line exerted thereby passes substantially tangentially through, or chordally below, the gap comprises an important feature of this invention. The tangential force generated by tightening nut 44 causes additional forces to act on the lap joint. A large normal force is generated in the area of the clamp directly under the curved bolt end 34 and extension 40. This large localized force is caused by the increased stiffness provided by this configuration, and provides superior gripping action. In addition to this localized force, uniformly distributed normal forces act radially inward across the band 26 about the remainder of the circumference to provide a seal. Use of a single nut 44 reduces installation time and cost. In addition, tests have shown that superior strength and leakproof performance are achieved with relatively low installation torque on the nut 44 as compared to other clamps.

Referring now to FIGS. 6-8, there is shown a clamp 60 incorporating a second embodiment of the invention herein. The clamp 60 includes components which are substantially identical in construction and function to corresponding components of clamp 20 shown in FIGS. 1-5. These components have been identified in FIGS. 6-8 with the same reference numerals utilized in connection with clamp 20, but have been distinguished therefrom by means of prime (') notations.

The primary distinction between the first and second embodiments involves the fact that clamp 60 incorporates an adapter or extension 62 which is also of substantially U-shaped cross section, but which does not include any flanges extending to the sides of band 26' as does clamp 20. Extension 62 is connected to the band 26' adjacent end 30' by fillet welds 64 extending circumferentially away from end 30 inward of the edges of band 26'. In addition, the extension 62 extends over the gap between ends 28' and 30' such that it serves as a guide for the other end 28' when bolt 44' is tightened to secure the clamp 60. Otherwise, clamp 60 has substantially the same advantages and functions the same as clamp 20.

Referring now to FIGS. 9-11, there is shown a clamp 70 incorporating a third embodiment of the invention herein. Clamp 70 also includes elements which are substantially identical in construction and function to elements of clamp 20 shown in FIGS. 1-5. Such identical elements have been designated in FIGS. 9-11 with the same reference numerals utilized in connection with clamp 20, but have been differentiated therefrom by means of a double prime (") notation.

The primary distinction between the first and third embodiments involves the fact that the curved bolt 32" of clamp 70 is secured to band 26" by means of integral clips or extensions 72 and 74 formed at the ends 28" and 30" of the band. The band ends 28" and 30" still define a longitudinal gap in the band 26", but the ends of the band in clamp 70 are folded and are not sharp in the sense of the ends in the other two embodiments herein. The extension 72 includes an outwardly extending portion 76, a radially inwardly extending portion 78, and a circumferentially inwardly extending base portion 80 which engages the outside of band 26" and the inside of the band defining the end 28". Similarly, the extension 74 includes an outwardly extending portion 82, a radially inwardly extending portion 84, and a circumferentially inwardly extending base portion 86 which engages the outside of band 26" and the inside corner of the fold defining end 30". The head 88 of bolt 32" engages extension 72, while nut 44" engages extension 74. The curved bolt 32" extends through apertures 90, 92 and 94 formed in extensions 72 and 74, as is best seen in FIGS. 10, and 11, and can thus be removed from clamp 70 if desired. This construction eliminates the need for a separate extension and welding of the extension and the bolt to the band, as in the first and second embodiments. In all other respects, the clamp 70 has substantially the same advantages and functions the same as clamp 20.

Tests have been conducted to verify the improved performance offered by the clamp herein. Several samples of the type shown in FIGS. 1-5 were constructed with various angles alpha (α), and the nuts were torqued to between 50 and 70 foot pounds about lap joints which were subjected to longitudinal pull apart tests. The results, which confirm that the clamp herein provides improved pull apart strength at reasonable installation torques, are set forth below.

| Sample | Alpha (α) | Pull Apart Force (Lbs.) |
| --- | --- | --- |
| 1 | 32 degrees | 1280-1380 |
| 2 | 42 degrees | 1830-2350 |
| 3 | 62 degrees | 1840-2260 |
| 4 | 88 degrees | 2110-2260 |
| 5 | 98 degrees | 2350-2690 |

From the foregoing, it will be apparent that the present invention comprises an improved clamp for lap joints in exhaust systems having several advantages over the prior art. High gripping forces with improved pull-apart strength from reasonable installation torques and a substantially leakproof joint can be obtained with little or no pipe deformation and fewer parts. Other advantages, such as installation ease and speed, and reduced labor when clamps are pre-attached to tube ends, will be evident to those skilled in the art.

Although particular embodiments of the invention have been illustrated in the accompanying Drawings and described in the foregoing Detailed Description, it will be understood that the invention is not limited to the specific embodiments disclosed, but is intended to embrace any alternatives, modifications, equivalents and/or rearrangements of elements falling within the scope of the invention as defined by the following claims.

We claim:

1. In combination with an exhaust treatment device having an outer tube adapted for receiving the end of an inner tube, a heavy-duty clamp for securing the overlapped ends of the tubes to form a lap joint, comprising:

a split generally cylindrical band having inside and outside circumferential surfaces, opposite circular edges, and opposite adjacent spaced apart longitudinal ends defining a gap therebetween;

an extension secured to the outside surface of said band adjacent one end thereof, said extension including a generally tangential opening therethrough;

a bolt positioned over the gap about midway between the edges of said band, said bolt having a curved end and an opposite straight threaded end;

the curved end of said bolt being circumferentially engaged with the outside surface of said band on opposite sides of the gap but secured to said band only adjacent the other band end, with the straight threaded end slideably extending through the opening in said extension; and a nut secured to the threaded end of said bolt, the curved end of said bolt and said extension being respectively secured to said band adjacent its respective ends over predetermined circumferential arc distances so that the effective closing force line exerted upon said split band by tightening said nut against said extension passes across said band substantially tangential to said gap.

2. A heavy-duty clamp, which comprises:

a split generally cylindrical band having inside and outside surfaces, opposite circular edges, and opposite adjacent circumferentially spaced apart longitudinal ends defining a gap therebetween;

means defining an extension secured to the outside surface adjacent one end of said band;

a bolt positioned over the gap about midway between the edges of said band, said bolt having a curved end and an opposite straight threaded end;

the curved end of said bolt being circumferentially engaged with the outside surface of said band on opposite sides of the gap but secured to said band only over a predetermined circumferential distance adjacent to the other end of said band, with the straight threaded end of said bolt slideably extending through said extension means; and a nut secured to the threaded end of said bolt for drawing said bolt and said extension, and the ends of said band, together to tighten the clamp.

3. The clamp of claim 2, wherein said band and said bolt are formed of metal and the curved end of said bolt is secured to said band by welding.

4. The clamp of claim 2, wherein a portion of said extension bridges the gap in said band and slideably engages the other end of said band.

5. The clamp of claim 2, wherein said extension means comprises an elongated member of inverted substantially U-shaped cross section secured by welding to said band.

6. The clamp of claim 2, wherein said nut is a flanged nut.

7. A heavy-duty clamp for securing the telescoped ends of two adjacent sections of tubing to form a lap joint, comprising:

a split generally cylindrical band having inside and outside circumferential surfaces, opposite circular edges, and opposite adjacent spaced apart longitudinal ends defining a gap therebetween;

an extension secured to the outside surface of said band adjacent one end thereof, said extension including a generally tangential opening therethrough;

a bolt positioned over the gap about midway between the edges of said band, said bolt having a curved end and an opposite straight threaded end;

the curved end of said bolt being circumferentially engaged with the outside surface of said band on opposite sides of the gap but secured to said band only adjacent the other band end, with the straight threaded end of said bolt slideably extending through the opening in said extension; and a nut secured to the threaded end of said bolt, the curved end of said bolt and said extension being respectively secured to said band adjacent its respective ends over predetermined circumferential arc distances so that the effective closing force line exerted upon said split band by tightening said nut against said extension passes across said band near said gap.

8. The clamp of claim 7, wherein said band and said bolt are formed of metal and the curved end of said bolt is secured to said band by welding.

9. A heavy-duty clamp for securing the telescoped ends of two adjacent sections of tubing to form a substantially leak-proof lap joint, comprising:

a split band having inside and outside surfaces, opposite edges, and opposite adjacent spaced apart ends defining a gap therebetween;

an extension of inverted generally U-shaped cross section secured to the outside surface of said band adjacent one end thereof, said extension including a generally tangential opening therethrough;

a rigid elongate member positioned over the gap between the edges of said band, said member having a curved end and an opposite straight threaded end;

the curved end of said member being circumferentially engaged about the outside surface of said band on opposite sides of the gap but secured to said band only adjacent the other band end, with the straight threaded end slideably extending through the opening in said extension; and a nut secured to the threaded end of said member, the curved end of said member and said extension being respectively secured to said band adjacent its respective ends over predetermined circumferential arc distances so that the effective force line exerted upon said split band by tightening said nut against said extension passes across said band near said gap.

10. The clamp of claim 9, wherein said band, extension, elongate member, and nut are all formed from metal.

11. The clamp according to claim 10, wherein the curved end of said elongate member and said extension are secured to said band by welding.

12. The clamp of claim 9, wherein said extension extends across the gap for engaging and guiding the said other band end, but is secured only adjacent the said one end of said band.

* * * * *